US009832667B2

(12) United States Patent
Fechtel (10) Patent No.: US 9,832,667 B2
(45) Date of Patent: Nov. 28, 2017

(54) METHOD AND DEVICE FOR INTERFERER SCHEDULING DETECTION AND NOISE AND INTERFERER PARAMETER ESTIMATION

(71) Applicant: Intel IP Corporation, Santa Clara, CA (US)

(72) Inventor: Stefan Fechtel, Zorneding (DE)

(73) Assignee: Intel IP Corporation, Santa Clara, CA (US)

(*) Notice: Subject to any disclaimer, the term of this patent is extended or adjusted under 35 U.S.C. 154(b) by 158 days.

(21) Appl. No.: 14/660,094

(22) Filed: Mar. 17, 2015

(65) Prior Publication Data

US 2015/0271687 A1    Sep. 24, 2015

(30) Foreign Application Priority Data

Mar. 20, 2014   (DE) .......................... 10 2014 103 853

(51) Int. Cl.
  *H04W 24/02*   (2009.01)
  *H04L 5/00*    (2006.01)
  *H04W 72/12*   (2009.01)

(52) U.S. Cl.
  CPC ............. *H04W 24/02* (2013.01); *H04L 5/00* (2013.01); *H04W 72/1231* (2013.01)

(58) Field of Classification Search
  CPC .. H04B 1/7097; H04B 1/7101; H04B 17/309; H04B 1/12; H04B 7/0857; H04B 17/336; H04L 25/03821; H04L 27/2691; H04L 25/0202; H04L 25/024; H04L 25/067; H04L 25/068; H04L 25/069; H04J 11/0043; H04W 28/0236; H04W 72/082

See application file for complete search history.

(56) References Cited

U.S. PATENT DOCUMENTS

| 5,991,273 A | 11/1999 | Abu-Dayya |
| 2002/0186761 A1* | 12/2002 | Corbaton .................. H04L 1/20 375/231 |
| 2004/0013189 A1* | 1/2004 | Jayaraman ............ H04L 25/067 375/233 |

(Continued)

FOREIGN PATENT DOCUMENTS

CN    102711122 A    10/2012

OTHER PUBLICATIONS

Office Action dated Apr. 14, 2016 for Taiwan Patent Application No. 104104391 (with English translation).

(Continued)

*Primary Examiner* — Benjamin H Elliott, IV
(74) *Attorney, Agent, or Firm* — Schiff Hardin LLP (57) ABSTRACT

A method for estimating noise and interferer parameters includes receiving a signal comprising a noise and interference signal contribution. Noise and interference power samples are generated based on the signal. The noise and interference power samples are quantized into quantization levels. The occurrences of noise and interference power samples are accumulated for each quantization level during an observation period. Noise and interferer parameters are estimated based on the number of occurrences of noise and interference power samples per quantization level during the observation period.

22 Claims, 5 Drawing Sheets

(56) References Cited

U.S. PATENT DOCUMENTS

| | | | |
|---|---|---|---|
| 2006/0227854 A1* | 10/2006 | McCloud | H04B 1/1027 375/148 |
| 2007/0020919 A1 | 1/2007 | Adem et al. | |
| 2010/0054373 A1 | 3/2010 | Reial | |
| 2012/0219097 A1* | 8/2012 | McCloud | H04L 25/03242 375/341 |
| 2015/0271687 A1* | 9/2015 | Fechtel | H04W 24/02 370/252 |

OTHER PUBLICATIONS

LTE, Evolved Universal Terrestrial Radio Access (E-UTRA); Physical channels and Modulation (3GPP TS 36.211 version 11.0.0 Release 11) ETSI TS 136 211 V11.0.0, Oct. 2012, 29 pgs.

* cited by examiner

METHOD AND DEVICE FOR INTERFERER SCHEDULING DETECTION AND NOISE AND INTERFERER PARAMETER ESTIMATION

FIELD

The invention relates to the field of radio communications, and more particularly to the techniques of detecting interference scheduling and estimating interfering signal's parameters based on a radio signal received in mobile networks according to a mobile communications standard such as, e.g., 3GPP Long Term Evolution.

BACKGROUND

Modern cellular networks face the challenge that the demand for high-speed data and media transport is increasing dramatically. Network operators need to modify their networks to increase the overall capacity. One solution may be to place denser macro cells in homogeneous networks. However, this solution may be very costly and rapidly moving users might be required to perform handovers very frequently. Another solution may be heterogeneous networks. One macro cell may be used for coverage of a larger area and small (e.g., pico or femto) cells may be placed into the coverage area to increase the capacity at some "hot spots". In both homogeneous and heterogeneous networks, the user equipment (UE) operates in dynamic scenarios with multiple interfering cells which may be scheduled on a short time basis. Interference detection and parameter estimation are crucial to proper functioning of critical UE functions such as, e.g., channel estimation, detection, and CQI (Channel quality Indicator) feedback.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

In the following, embodiments are described with reference to the drawings wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as it may be desired and advantageous for any given or particular application.

The methods and devices described herein relate to interference scenario detection and/or noise and interferer parameter estimation. It is understood that comments made in connection with a described method may also hold true for a corresponding device circuit configured to perform the method and vice versa. For example, if a specific method step or process is described, a corresponding device may include a unit to perform the described method step or process, even if such a unit is not explicitly described or illustrated in the figures.

The methods and devices described herein may be implemented in wireless communication networks, in particular communication networks based on mobile communication standards such as, e.g., LTE (Long Term Evolution) and/or OFDM (Orthogonal Frequency-Division Multiplexing), or other standards such as, e.g., the GSM/EDGE (Global System for Mobile Communications/Enhanced Data Rates for GSM Evolution) standard and/or the UMTS/HSPA (Universal Mobile Telecommunications System/High Speed Packet Access) standard or derivatives thereof. The methods and devices described below may further be implemented in a mobile device (or mobile station or User Equipment (UE)) or in a base station (also referred to as NodeB, eNodeB).

The methods and devices described herein may be configured to transmit and/or receive radio signals. Radio signals may be radio frequency signals radiated by a radio transmitting device (or radio transmitter or sender) with a radio frequency lying in a range of, e.g., about 3 Hz to 300 GHz.

The methods and devices described hereinafter may be designed in accordance with mobile communication standards such as, e.g., LTE. LTE, marketed as 4G LTE, is a standard for wireless communication of high-speed data for mobile phones and data terminals. It is based on the GSM/EDGE and UMTS/HSPA network technologies, increasing the capacity and speed using a different radio interface together with core network improvements. The standard is developed by the 3GPP (3rd Generation Partnership Project) and is specified in its Release 8 document series, with enhancements described presently in Releases 9, 10 and 11.

The methods and devices described hereinafter may be applied in OFDM systems. OFDM is a scheme for encoding digital data on multiple carrier frequencies. OFDM has developed into a popular scheme for wideband digital communication, whether wireless or over copper wires, used in applications such as digital television and audio broadcasting, DSL broadband internet access, wireless networks, and 4G mobile communications. OFDM is a frequency-division multiplexing (FDM) scheme used as a digital multi-carrier modulation method. A large number of closely spaced orthogonal subcarrier signals may be used to carry data. The orthogonality may prevent crosstalk between subcarriers. The data may be divided into several parallel data streams or channels, one for each subcarrier. Each subcarrier may be modulated with a conventional modulation scheme (such as quadrature amplitude modulation or phase-shift keying) at a low symbol rate, maintaining total data rates similar to conventional single-carrier modulation schemes in the same bandwidth. OFDM may be essentially identical to coded OFDM (COFDM) and discrete multi-tone modulation (DMT).

The methods and devices described hereinafter may be applied in multi-layer homogeneous or heterogeneous networks. Multi-layer homogeneous and heterogeneous networks (HetNets) may, e.g., be used in LTE and LTE-Advanced standards. HetNets may be used to build up the network of not only a single type of eNodeB (homogeneous network), but to deploy eNodeBs with different capabilities, most importantly different Tx-power classes. These eNodeBs may commonly be referred to as macro eNodeBs (MeNB) or macro cells, pico eNodeBs (PeNB) or pico cells and femto/home eNodeBs (HeNB) or femto cells and meant for basic outdoor, outdoor hot-zone and indoor/enterprise coverage, respectively. Alternatively, the term "small cells" might be used as a broader term covering pico and femto cells.

Macro cells may cover a large cell area (typical cell radius being of the order of 500 meters to a kilometer), with transmit antennas above the clutter and transmission power of the order of 46 dBm (20 watts). They may provide service to all users. Femto cells, also called Home eNodeBs (HeNBs) may be lower power cells installed (typically indoors) by an end-consumer. Pico cells may be operator deployed cells, with lower transmission powers—typically an order of magnitude smaller—relative to macro cell eNodeBs. They may be installed typically in wireless hotspot areas (for example, malls) and provide access to all users. In a scenario where a UE is connecting to pico cells, the pico cell may represent the target cell while the macro cell may represent the interfering cell providing strong interference.

The methods and devices described hereinafter may be applied in eICIC (enhanced Inter-Cell Interference Coordination) systems. eICIC is used in Release 10 3GPP to avoid heavy inter-cell interference on both data and control channels of the downlink. eICIC may be based on carrier aggregation with cross-carrier scheduling or based on TDM (Time-Domain Multiplexing) using so called almost blank subframes (ABS).

eICIC based on Carrier Aggregation may enable an LTE-A UE to connect to several carriers simultaneously. It not only may allow resource allocation across carriers, it also may allow scheduler based fast switching between carriers without time consuming handover. A simple principle in a HetNet scenario may be to partition the available spectrum into, e.g., two separate component carriers and assign the primary component carriers (PCC) to different network layers. The primary component carrier may be the cell that provides the control information to the UEs. Each network layer can additionally schedule UEs on other CCs called secondary component carriers (SCC).

The methods and devices described hereinafter may be applied in interference aware receivers such as IRC (Interference Rejection Combining) receivers. IRC is a technique that may be used in an antenna diversity system to suppress co-channel interference by using the cross covariance between the noise in diversity channels. IRC may be used as an efficient alternative to increase uplink bit rates in areas where cells overlap. The IRC receiver may be effective in improving the cell-edge user throughput because it may suppress inter-cell interference. The IRC receiver may be typically based on a minimum mean square error (MMSE) criteria, which may require channel estimation and covariance matrix estimation including the inter-cell interference with high accuracy.

The methods and devices described hereinafter may be applied in MIMO (Multiple-Input Multiple-Output) systems. MIMO wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which is described by the channel matrices between respective antennas of the transmitter and respective antennas of the receiver.

This disclosure presents an approach for interference scenario detection and noise and interferer parameter estimation in synchronized mobile networks such as, e.g., LTE networks, in particular LTE-Advanced networks in accordance with Rel-11+. In LTE networks neighboring cells may use the same frequency band as the serving cell and a mobile device at the cell edge may face strong interference from multiple cells. That is, in homogeneous and heterogeneous networks, mobile devices operate in very dynamic scenarios with multiple interfering cells which may be scheduled per subframe or even per PRB (Physical Resource Block). In particular heterogeneous network deployments may increase this issue as multiple pico cells and/or femto cells may be placed inside the coverage area of a macro cell. Therefore, the noise-plus-interference power (and thus the SINR (signal-to-interference-plus-noise ratio)) may change drastically at, e.g., each block boundary. Interference detection and interferer parameter estimation may therefore be crucial to the overall receiver performance and, in particular, the proper functioning of critical receiver functions such as, e.g., channel estimation, detection, and CQI (Channel Quality Indicator) feedback.

While the number of relevant interferers may in some cases be known to the mobile device (e.g., by virtue of the cell search or signaling), the interferer scheduling pattern is, in general, unknown, as well as the noise parameters (e.g., the noise power and their variance) of the noise sources and the interferer parameters (e.g., the interferer powers and their variances) of each (scheduled) interferer signal. Therefore, interference scheduling detection and noise and interferer parameters estimation as described herein may improve knowledge on the interference scenario in the mobile device.

Figure 1:
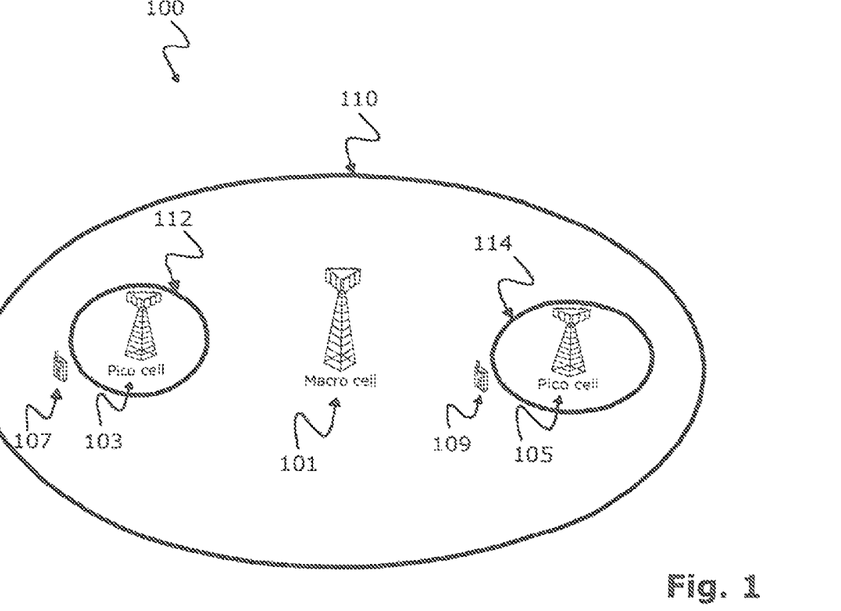
FIG. 1 is a schematic diagram of a network including a macro cell and pico cells according to an interference scenario.

FIG. 1 is a schematic diagram of a heterogeneous network 100 including a macro cell 101 and pico cells 103, 105. The pico base stations in pico cells 103, 105 may be characterized by substantially lower transmit power as compared to the macro base station in macro cell 101. Due to the large disparity between the transmit power levels among two type of base stations, the coverage 112, 114 of the pico cells 103, 105 is significantly smaller than the coverage 110 of the macro base station as shown in FIG. 1. The larger coverage 110 of the macro cells 101 may attract more UEs 107, 109 towards high power macro eNodeB although there might not be enough resources to efficiently serve all UEs. At the same time, the resources of smaller power base station may remain underutilized. The UEs 107, 109 may include interference scenario detection and/or interferer parameter estimation as described in the following.

Figure 2:
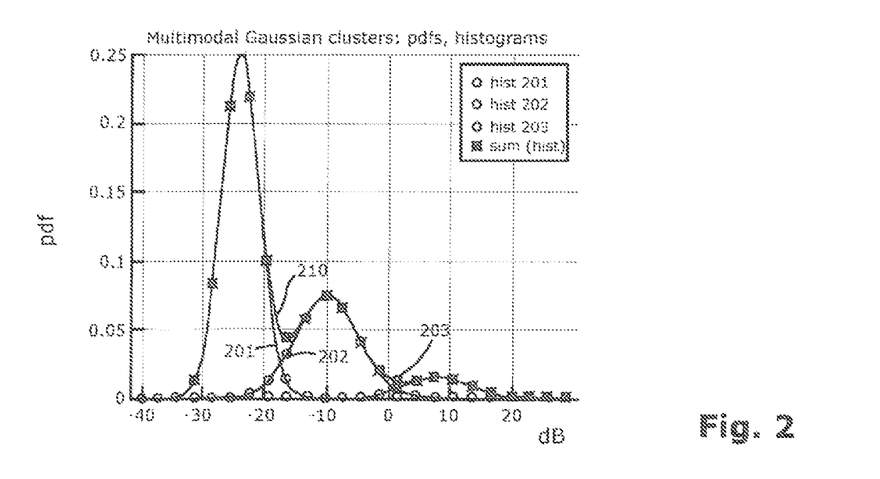
FIG. 2 is a graph illustrating a probability density function of a realistic noise and interference power profile experienced in an interference scenario with K=3 noise and interference sources on a logarithmic scale (units of dB).

FIG. 2 illustrates a typical interference scenario with K=3 noise and interference sources. That is, by way of example, a mixture of noise (probability density function (pdf) curve 201, mean power $\mu_1=-24$ dB), a first interferer (pdf curve 202, mean power $\mu_2=-10$ dB) and a second interferer (pdf curve 203, mean power $\mu_3=+8$ dB) are depicted. Further, the total probability density function, which is the sum of the probability density functions of the K noise and interference sources, is depicted as "envelope" pdf curve 210 in FIG. 2.

The probability density function of each noise and interference source (i.e. the pdf curves 201, 202, 203) may be modeled by a reference distribution (e.g., a Gaussian probability distribution) with individual parameters $g_k$ (weight factor of distribution k), $\mu_k$ (mean value of distribution k), and $\sigma_k$ (standard deviation of distribution k), with k=1, ..., K. Thus, the multimodal mixture model of k=1, ..., K noise and interference sources may be described by a set of parameters (K; $g_k$, $\mu_k$, $\sigma_k$), k=1, ..., K. It is to be noted that the K noise and interference sources may comprise both noise sources (here, e.g., k=1) and interference sources (i.e. "interferers") (here, e.g., k=2, 3). The interferers are scheduled, the noise sources are not.

In order to model the interference scenario of K noise and interference sources, a histogram may be generated and the noise and interference source parameters may be derived from the histogram. The histogram may be generated on the basis of incoming noise and interference power samples. To that end, the incoming noise and interference power samples may be quantized into quantization levels and their occurrence may be accumulated for each quantization level, thus forming a histogram of noise and interference power levels. FIG. 2 illustrates the sum histogram obtained on the basis of the incoming noise and interference power samples by crossed bullets. Further, FIG. 2 illustrates histograms of each noise and interference source by bullets.

That is, a noise and interference power detector may be implemented in an UE (or a base station) and may be configured to deliver during a predetermined observation period power samples. In order to obtain the sum histogram (crossed bullets) of FIG. 2, these power samples are quantized into quantization levels, e.g., with 3 dB spacing as illustrated in FIG. 2. The occurrences of noise and interference power samples are accumulated for each quantization level during the predetermined observation period resulting in the sum histogram shown in FIG. 2. From the sum histogram of FIG. 2, the number K of noise and interference sources and the parameters of the noise and interference sources may be derived.

As will be explained in more detail further below, by virtue of the noise and interference source parameters, an interference scheduling decision of a detected noise and interference source may be generated. This interference scheduling decision may be generated for each input noise and interference power sample and forwarded to all instances of the UE which are configured to make use of this information (e.g., channel estimation (CE), detection, CQI feedback generation).

Figures 3A, 3B:
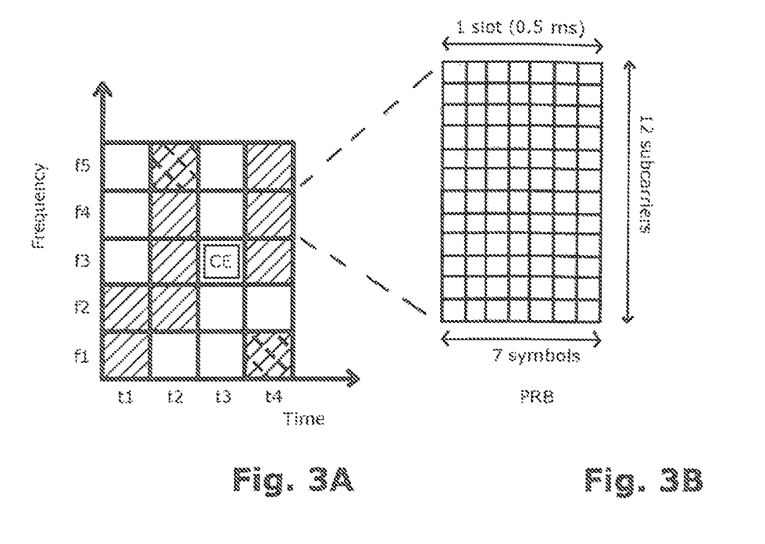
FIG. 3A is a schematic diagram of a scheduling pattern of physical channel resources in a time-frequency representation illustrating resource blocks scheduled to a first interferer, resource blocks scheduled to a second interferer, and non-scheduled resource blocks.
FIG. 3B is a schematic diagram of a resource block in a time-frequency representation illustrating, by way of example, a LTE physical resource block (PBR).

FIG. 3A illustrates an interferer scheduling pattern as an example of a dynamic interference scenario with two interfering cells C1 and C2. By way of example, a 3GPP-LTE downlink transmission is considered. The time domain is divided into time slots t1, t2, t3, t4, . . . , wherein each time slot may have a duration of, e.g., 0.5 ms. The frequency domain may be divided into carriers f1, f2, f3, f4, f5, . . . , wherein each carrier may have a frequency range of, e.g., 180 kHz. Each physical resource block (PRB) may occupy one slot (e.g., 0.5 ms) in time and one carrier (e.g., 180 kHz) in frequency.

FIG. 3B illustrates by way of example one PRB. As shown in FIG. 3B, a PRB may occupy, e.g., 12 subcarriers in frequency and, e.g., 7 symbols in time. A subcarrier-slot element may be referred to as a resource element. The PRB defines the mapping of certain physical channels to the resource elements of the PRB.

Returning to FIG. 3A, the first interfering cell C1 may correspond to the noise-plus-interference source of mean power $\mu_2=-10$ dB of FIG. 2 (i.e. the first interferer of k=2) and the second interfering cell C2 of FIG. 3A may correspond to the second noise-plus-interference source of mean power $\mu_3=+8$ dB of FIG. 2 (i.e. the second interferer of k=3). As illustrated in FIG. 3A, the first interferer may have a 50% scheduling occurrence (scheduled are in t1: f1, f2; in t2: f2, f3, f4, f5; in t4: f1, f3, f4, f5), and the second interferer may have a 10% scheduling occurrence (scheduled are in t2: f5; in t4: f1). Other blocks (such as, e.g., in t1: f3, f4, f5; in t2: f1; in t3: f1, f2, f4, f5; in t4: f2) are not scheduled. As it is apparent from FIG. 3A, interferer scheduling may, e.g., be performed on block basis or, e.g., on subframe basis (one subframe may be defined by two consecutive time slots, i.e. by a PRB pair).

Such a dynamic interferer scheduling pattern may strongly affect core receiver functions such as, e.g., channel estimation (CE), detection, and CQI feedback generation functions. By way of example, CE attempts to generate channel estimates for a particular block (e.g., PRB at f3 in t3) by filtering pilot symbols located on a larger time/frequency grid as illustrated in FIG. 3A. By way of example, a time/frequency region including pilot symbols contributing to CE at f3 in t3 may comprise, e.g., 1 to 5, in particular 3 slots in time and, e.g., 3 to 8, in particular 5 carriers (e.g., PRB lengths) in frequency. The estimation filters need to be adapted to the varying pattern of block interference. This adaption of filter parameters for CE is aided by the proposed interference scheduling detection and noise and interference source parameter estimation method as described herein.

Figure 4:
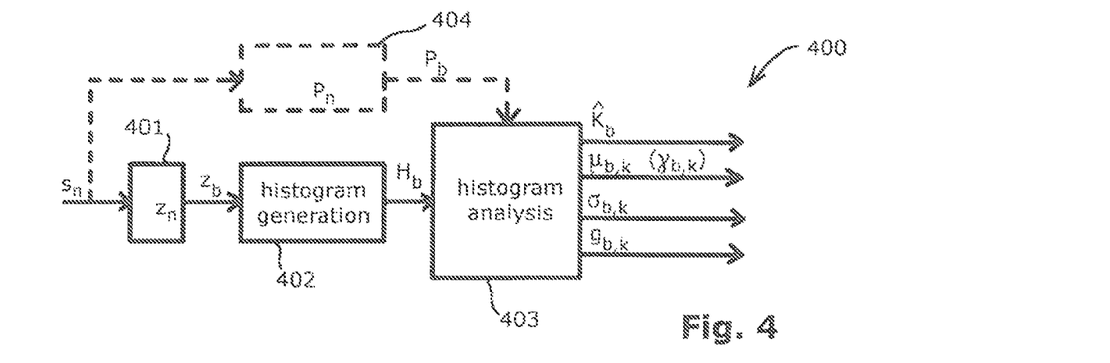
FIG. 4 is a block diagram illustrating an exemplary implementation of a device for estimating noise and interferer parameters using histogram analysis.

FIG. 4 illustrates an exemplary device 400 for estimating the number K of present noise and interference sources and the parameters of these noise and interference sources using histogram analysis. FIG. 4 also illustrates a method of estimating the number K of present noise and interference sources and the parameters of the noise and interference sources using histogram analysis. In the following the noise and interference source parameters will also be referred to as noise and interferer parameters herein.

The device 400 may comprise an interference-plus-noise power sample generation unit 401 configured to generate noise and interference power samples $z_n$ of a received signal s. That is, the noise and interference power samples $z_n$ are indicative of the interference-plus-noise power of incoming signal sample $s_n$. The integer n is the sampling index. There are many possibilities of implementing the power sample generation unit 401. By way of example, a so-called pre-CE function (which uses block CRS (Cell-Specific Reference Signals) channel estimation (CE) prior to regular channel estimation) may be used which yields power peaks with bias in the order of, e.g., 1 dB and standard deviations in the order of, e.g., 3 to 5 dB. This may set the target accuracy for interference-plus-noise power estimation (e.g., to about 1 dB).

The noise and interference power samples $z_n$ may be passed to an occurrence accumulation unit 402. The occurrence accumulation unit 402 is also referred to as histogram generation unit herein.

The occurrence accumulation unit 402 may comprise a quantize-and-accumulate function. The noise and interference power samples $z_n$ may be quantized into quantization levels and the occurrence of noise and interference power samples $z_n$ for each quantization level may be accumulated over an observation period. That way, a histogram is formed during one observation period.

The histogram quantization levels may be predetermined or may be variably adjustable. The quantization levels could be sufficiently dense to render the histogram a sufficient statistic. That is, quantization level spacing may be set so as to nearly or fully satisfy the sampling theorem for probability density profiles to be resolved. That is, the probability density profile, viewed as a low pass signal, may be (over) sampled by the histogram. By way of example, this is the case in FIG. 2, where histogram samples (bullets) with 3 dB spacing represent the mixture probability density (sum pdf) without loss of information. In general, the histogram quantization spacing may be set to be equal to or smaller than $\min(\sigma_k)$ for k=1, . . . K, so that all relevant interferers (i.e. noise and interference sources) could be resolved.

Occurrence accumulation is done over a predetermined or adjustable observation period. By way of example, a block of input power samples $z_b$, e.g., per-PRB power samples $z_n$, are used to form a histogram. By way of example, one histogram may be generated from a number N of blocks or subframes, where N is an integer equal to or greater than 1. N times the block length (or the subframe length) may thus define the observation period over which power-specific occurrence accumulation is performed.

By way of example, an efficient way of generating a histogram may comprise finding the MSB (most-significant-bit) position of each input power sample $z_n$ and counting its occurrence for all input power samples $z_n$ of the observation period. For instance, 24 bit input power samples $z_n$ of 12 bit I/Q signals yield histograms with, e.g., L=24 samples, 69 dB dynamic range, and quantization 3 dB.

Histograms $H_b$ accumulated in occurrence accumulation unit 402 during the observation period (e.g., N blocks) may be passed to an estimator 403 configured to estimate noise and interferer parameters based on received histograms $H_b$. By way of example, estimator 403 may generate the (estimated) number of noise sources and interferers $\hat{K}$. The estimator 403 may further generate the mean power $\mu_k$ and/or the power standard deviation $\sigma_k$ (or variance) and/or the gain factor $g_k$ of the partial noise probability density profile. Further, the noise and interferer parameters generated by the estimator 403 may comprise noise and interference source separation power thresholds $\theta_k$ of the noise and interference power samples of the received signal. These noise and interferer parameters may be generated for one observation period (i.e. per received histogram) or on the basis of a plurality of received histograms, as will be explained further below in the context of "parameter tracking".

Histogram analysis may follow the general expectation-maximization (EM) strategy:
1) Expectation (E): assign each observation to a noise and interference source k (i.e., to a noise source and/or an interferer, if present).
2) Maximization (M): estimate noise and interferer parameters (e.g., $\hat{K}$, $g_k$, $\mu_k$, $\sigma_k$, and/or $\theta_k$).

A basic EM-scheme as explained above may use the following features: E-process (Expectation):
(1) Histogram samples $H_m$ (m=1, . . . , M) are used as observations (instead of power samples $z_n$). M is the number of quantization levels, m is the quantization index and $H_m$ is the number of (accumulated) occurrences. $H_b$ may be defined as a set of histogram samples $\{H_m | m=1, \ldots, M\}$.
(2) The observations ($H_m$) may be assigned to a noise and interference source by way of soft assignment (instead of hard assignment). Soft assignment may utilize a weighting function for assigning observations to interferers. Hard assignment may assign quantization levels (and the observations accumulated therein) to noise and interference sources. A specific approach for soft assignment will be explained by way of example further below.

M-Process (Maximization):
(1) The noise and interference sources may be regenerated based on a part or all of the current noise and interferer parameters (e.g., $\hat{K}$, $g_k$, $\mu_k$, $\sigma_k$, and/or $\theta_k$) and a parametric noise and interference model (e.g. a Gaussian model, as already mentioned in conjunction with FIG. 2).
(2) A weighting function $v_k$ for soft assignment of the observations ($H_m$) to a specific noise and interference source may be generated.
(3) Noise and interferer parameters may be re-estimated based on soft assignment of observations, yielding updated noise and interferer parameters (e.g., $\hat{K}$, $g_k$, $\mu_k$, $\sigma_k$, and/or $\theta_k$).

It is to be noted that the estimator 403 may output noise and interferer parameters other than the parameters $\hat{K}$, $g_k$, $\mu_k$, $\sigma_k$, and/or $\theta_k$ specified above. By way of example, the estimator 403 may have an input receiving input signal power samples $p_n$ generated in an optional signal power estimator 404. The estimator 403 may be configured to generate average SINRs for each k based on the input signal power samples $p_n$ and on the mean noise and interference powers $\mu_k$ and/or the gain factors $g_k$. Then, instead of outputting the mean noise and interference powers $\mu_k$ and/or the gain factors $g_k$ or in addition to these parameters, the average SINRs of each noise and interference source k may be generated. The average SINRs of each noise and interference source k are denoted herein by $\gamma_k$. It is to be noted that if a specific noise and interference source k is, basically, a noise source, $\gamma_k$ is an SNR, and if a specific noise and interference source k is, basically, an interferer, $\gamma_k$ is an SIR.

Figure 5:
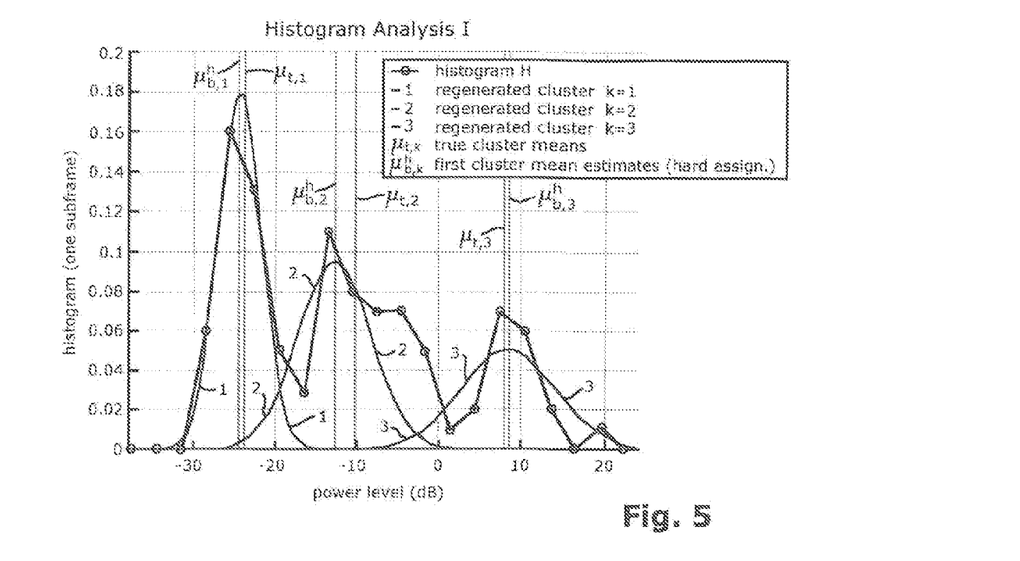
FIG. 5 is a graph illustrating a histogram generated on incoming noise and interference power samples over an observation period and a method of analyzing the histogram to obtain (preliminary) interferer parameters.

FIG. 5 illustrates an example of noise and interferer parameter acquisition based on histogram samples $H_m$ from an observation period of, e.g., one block or one subframe (two blocks). Here, by way of example, 100 input power samples $z_n$ are used. A first parameter estimate (e.g., $\hat{K}$, $g_k$, $\mu_k$, $\sigma_k$) is acquired from the histogram samples $H_m$ by peak detection (e.g. by a local maximum search), hard assignment of histogram samples $H_m$ to noise and interference sources (e.g., by assigning quantization index subsets m(k) covering a few histogram samples around each of the detected peaks to a noise and interference source k), and by computing the noise and interferer parameters, e.g., by invoking the definitions of mean and standard deviation and applying appropriate scaling:

$$g_k = \text{sum}(H(m_k))$$

$$\mu_k = \text{sum}(X(m_k)*H(m_k))/g_k$$

$$\sigma_k = \text{sqrt}(\text{sum}((X(m_k)-\mu_k)^2 * H(m_k))/g_k), \quad (1)$$

wherein X is the power level scale (in dB/log) of the input noise and interferer power sample $z_n$ and $X(m_k)$ is the subset of input power levels near the k-th detected peak. Thus, summing in equation (1) is performed for each noise and interference source k over the quantization index subset m(k) in a region (e.g., a few quantization intervals) around a detected local maximum (which is identified as a noise and interference source k in the histogram). The term sqrt( ) refers to the square root function.

The first parameter estimates (e.g. $\hat{K}$, $g_k$, $\mu_k$, $\sigma_k$) may then, e.g., be used as final noise and interferer parameters. However, as will be set forth below, the first parameters may also be used as preliminary parameters to regenerate the noise and interference source densities via a parametric noise and interference source model, in particular a model using, e.g., a Gaussian probability distribution.

The regenerated noise and interference source densities $r_{m(k)}$ for each identified noise and interference source k may be derived, e.g., as $$r_{m(k)} = g_k * N(m; \mu_k, \sigma_k) \quad (2)$$

and are depicted, by way of example, as curves 1, 2, and 3 for k=1, 2, and 3, respectively, in FIG. 5. Here, N(m; $\mu_k$, $\sigma_k$) may represent the Gaussian normal distribution of mean $\mu_k$, standard deviation $\sigma_k$ and subset m(k) of input power levels around the k-th detected peak. It is also possible to use other distributions, in particular if additional knowledge on the interferer scenario and/or on parameters of a specific interferer k is available (however, note that the approach described herein is in particular applicable for the case that the interferer scenario is completely or mostly unknown in the UE, i.e., if a minimum or no signaling indicative of the presence of interferers and/or their parameters is provided by the base station). It is to be noted that the gain factors $g_k$, which depend on the height of the corresponding local maximum of the histogram, may be used as a parameter for scaling the model distribution N(m; $\mu_k$, $\sigma_k$). Each gain factor $g_k$ is indicative of the intensity of the corresponding noise and interferer source k.

From the regenerated noise and interference source densities $r_{m(k)}$ soft assignment weighting functions $v_{m(k)}$ may be derived, e.g., as $$v_{m(k)} = r_{m(k)}/\text{sum}(r_{m(k)}). \quad (3)$$

Figure 6:
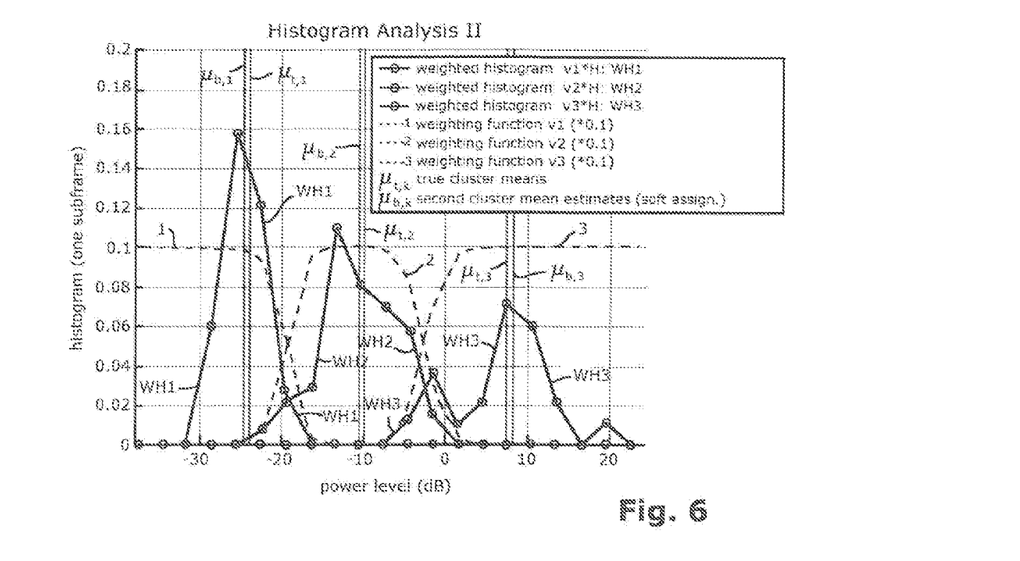
FIG. 6 is a graph illustrating the histogram of FIG. 5 and a method of re-analyzing the histogram to obtain noise and interferer parameters based on the preliminary interferer parameters.

The weighting functions v1 for k=1, v2 for k=2 and v3 for k=3 are depicted in FIG. 6 by dotted curves 1, 2, and 3, respectively.

The weighting functions v1, v2, v3 (i.e., the set of weighting factors $v_{m(k)}$ for each k=1, . . . , K) may then be used to perform soft assignment of the observations (i.e., histogram samples $H_m$ (m=1, . . . , M)) by computing noise and interference source-specific weighted histograms. These noise and interference source-specific weighted histograms are labeled in FIG. 6 by wH1, wH2, and wH3, respectively. Weighted histograms wH1, wH2, and wH3 are also referred to as soft-assigned histograms herein.

The noise and interferer parameters may then be re-estimated based on the soft-assigned histograms wH1, wH2, and wH3. Re-estimation may be performed the same way as in equation (1) but by replacing the subset of histogram samples $H(m_k)$ near peak k by the weighted histograms $H_{m(k)}$:

$$g_k = \text{sum}(H_{m(k)})$$

$$\mu_k = \text{sum}(X_m * H_{m(k)})/g_k$$

$$\sigma k = \text{sqrt}(\text{sum}((X_m - \mu_k)^2 * H_{m(k)})/g_k) \quad (4)$$

Thus, in equation (4), summing is performed over all (weighted) histogram samples (that is, summing may be performed over all power levels m=1, . . . , M in contrast to index subsets m(k) covering only a few histogram samples around each of the detected peaks as used in hard assignment analysis according to equation (1)). These second parameter estimates (e.g., $\hat{K}$, $g_k$, $\mu_k$, $\sigma_k$) are more accurate than the corresponding first (or preliminary) parameter estimates. They may be taken as final parameter estimates of the histogram analysis.

As may be seen when comparing FIG. 5 (hard-assigned histograms) and FIG. 6 (soft-assigned histograms), the mean estimates $\mu_k$ (which are of main interest in SINR estimation) are close to the true means $\mu_{t,k}$, and, by virtue of soft assignment of observations (histogram samples), in particular the second mean estimate $\mu_2$ has improved considerably. Further iterations (density function regenerations and parameter estimations) are possible and could be obtained if accuracy should be needed to be further improved.

It is to be noted that in FIGS. 5 and 6 as well as in FIG. 4, the subscript b is added to the estimated noise and interferer parameters in order to indicate that the corresponding parameter is derived on the basis of one histogram, i.e., during one observation period (e.g. N blocks). This index b is suppressed in equations (1) to (4) for ease of notification.

Figure 10:
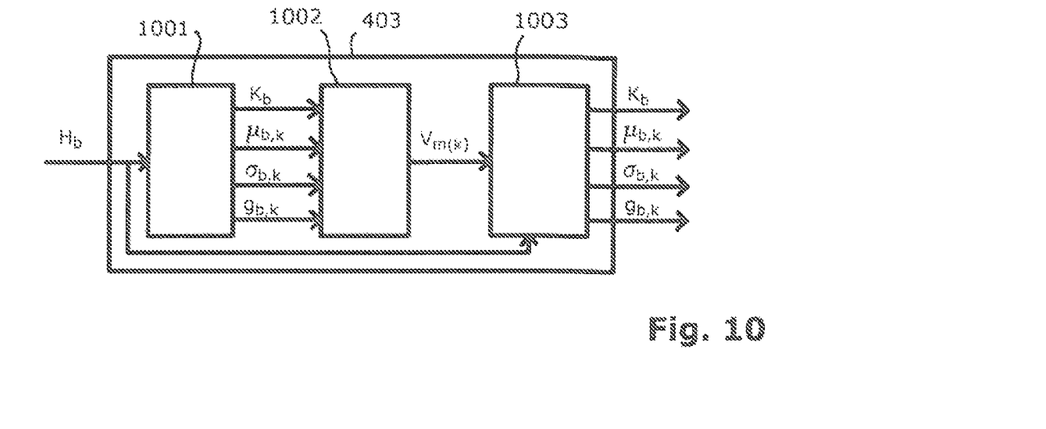
FIG. 10 is a block diagram of an exemplary estimator used in a device for estimating noise and interferer parameters

Referring to FIG. 10, the estimator 403 of FIG. 4 may, e.g., comprise a first estimator unit 1001 configured to estimate preliminary interferer parameters based on the number of occurrences of noise and interference power samples per quantization level over the observation period, wherein to each noise and interference source a predetermined interval of quantization levels is assigned (see, e.g., equation (1)). Further, the estimator 403 may comprise a second estimator unit 1002 configured to estimate a soft assignment weighting function $v_{m(k)}$ for each noise and interference source based on the preliminary noise and interferer parameters and a noise and interference source model probability distribution (see, e.g., equations (2) and (3)). The estimator 403 may further comprise a third estimator unit 1003 configured to estimate the noise and interferer parameters based on the soft assignment weighting function and the number of occurrences of noise and interference power samples per quantization level over the observation period (see, e.g., equation (4)). The estimator units 1001, 1002, and 1003 may be implemented in software or in hardware and, e.g., the first and third estimator units 1001 and 1003 may be implemented by the same circuitry.

Figure 7:
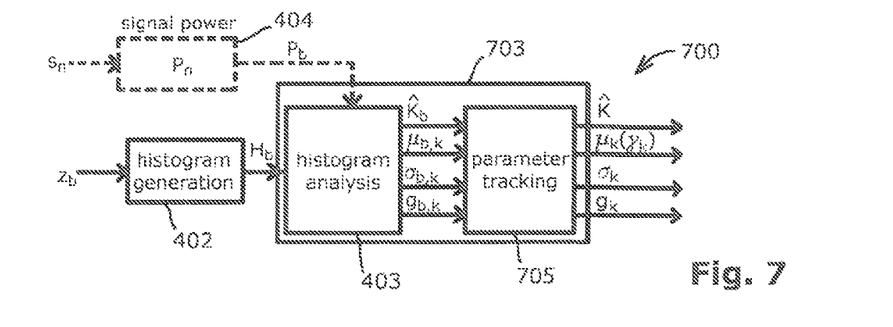
FIG. 7 is a block diagram illustrating an exemplary implementation of a device for estimating noise and interferer parameters using histogram analysis and parameter tracking.

FIG. 7 illustrates a device for estimating noise and interferer parameters 700. The device 700 is similar to device 400 and reference is made to the description above in order to avoid reiteration. However, a function of parameter tracking may be added. In FIG. 7, an estimator 703 configured to estimate noise and interferer parameters based on the number of occurrences of noise and interference power sample per quantization level during the observation period may further comprise a parameter evaluation unit 705. The parameter evaluation unit 705 may be configured to determine for each noise and interference source k a number of observation periods over which the noise and interference source (e.g., the scheduled interferer) is present. The parameter evaluation unit 705 may also be configured to average the noise and interferer parameters received from the estimator 403 (which are obtained by histogram analysis over one observation period) over a number of observation periods, e.g., over the number of observation periods over which the respective noise and interference source has been detected to be present.

More specifically, in the parameter evaluation unit 705 used for parameter tracking, the observation period-based parameter estimates (e.g., $\hat{K}_b$, $g_{b,k}$, $\mu_{b,k}$, $\sigma_{b,k}$) and, possibly, other observation period-based parameters are continuously updated to form long-term estimates $\hat{K}$, $g_k$, $\mu_k$, and $\sigma_k$, and, possibly, other parameters.

Based on a sequence of consecutive observation-period-based estimates $\hat{K}_b$, it may first be detected whether the interference scenario is stable or changing for each detected noise and interference source k. If it is stable, long-term parameter estimates may be refined by averaging the observation period-based parameter estimates. Otherwise, if the scenario is changing (i.e., new interferers are arising and old ones are disappearing), tracking may be initialized for the new interferers detected and abandoned for disappearing ones.

A change in the interference scenario is detected faster (within a few milliseconds) by choosing a short observation period length in histogram generation and analysis. By way of example, the observation period may, e.g., be as short as one or only a few block periods, wherein a block period is the minimum time basis on which the scheduling pattern may change (e.g., in LTE one block is one PRB). If the interference scenario is changing, tracking is initialized for the new noise and interference source detected and abandoned for the disappearing noise and interference source. It may be advantageous to spend more "intelligence" on post-processing of block parameter estimates in the evaluation unit 705 than choosing long observation periods in histogram generation and analysis by estimator 403.

Figure 8:
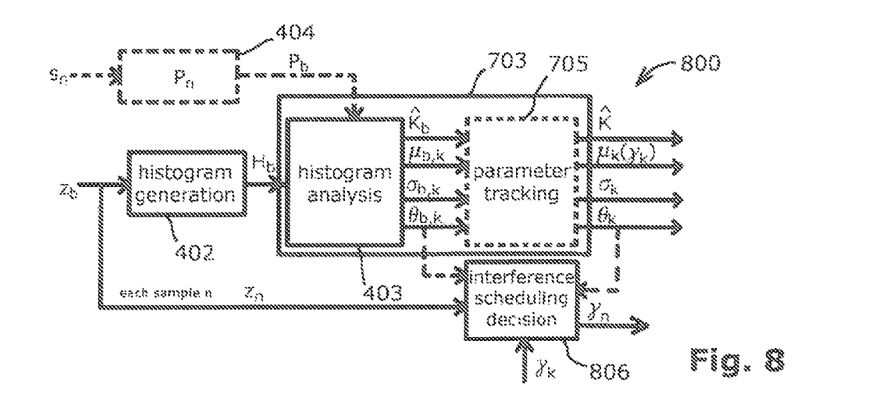
FIG. 8 is a block diagram illustrating an exemplary implementation of a device for estimating noise and interferer parameters using histogram analysis, optional parameter tracking and interference scheduling detection.

FIG. 8 illustrates a device for estimating noise and interferer parameters 800. The device 800 is similar to devices 400 and 700, and reference is made to the description above in order to avoid reiteration. Further, device 800 may include a unit for interference scheduling decision 806. The unit for interference scheduling decision 806 may have an input to receive an interferer separation thresholds $\theta_{b,k}$ on block basis (or, in general, on observation period basis) as, e.g., output by estimator 403 and/or an input to receive an interferer separation threshold $\theta_k$ as output, e.g., by evaluation unit 705. The interferer separation threshold $\theta_k$ may be an average of $\theta_{b,k}$ over a plurality of observation periods, e.g., a number of observation periods depending on or equal to the number of observation periods over which the respective interferer k is detected to be present.

By way of example, the interferer separation thresholds $\theta_{b,k}$ may be derived as a side product of histogram analysis. As illustrated in FIG. 6, the cross-over points between adjacent weighting functions $v_{m(k)}$ may be chosen to define the separation thresholds $\theta_{b,k}$.

The unit for interference scheduling decision 806 may output interference scheduling detection samples $\gamma_n$. The samples $\gamma_n$ may be given by any indicator $\gamma_k$ of the SINR of interferer k. The indicator $\gamma_k$ of the SINR of interferer k input in the interference scheduling decision unit 806 may, e.g., be generated by the estimator 703 (see, e.g., FIG. 9) or by another instance in the UE (see, e.g., FIG. 8).

The samples $\gamma_n$ may be determined by hard assignment based on the power samples $z_n$. By way of example, if the power sample $z_n$ falls within the range defined by the two long-term thresholds $\theta_k$ associated with interferer k, the SINR value $\gamma_k$ of interferer k may be output by the interference scheduling decision unit 806 as interference scheduling detection sample $\gamma_n$. The long-term thresholds $\theta_k$ may be derived from the observation period-based thresholds $\theta_{b,k}$, e.g., by parameter tracking as described above. As shown in FIG. 8, it is also possible to use the observation period-based thresholds $\theta_{b,k}$ as a basis for hard assignment in the interference scheduling decision unit 806. In both cases, network interferer scheduling is detected by the emergence of new threshold parameters (a new interferer becomes active) or by the disappearance of old threshold parameters (an old interferer vanishes). It is to be noted that this approach of interferer scheduling detection is particularly effective if the network is configured to signal no or only an insufficient information of interferer scheduling to the UEs.

Figure 9:
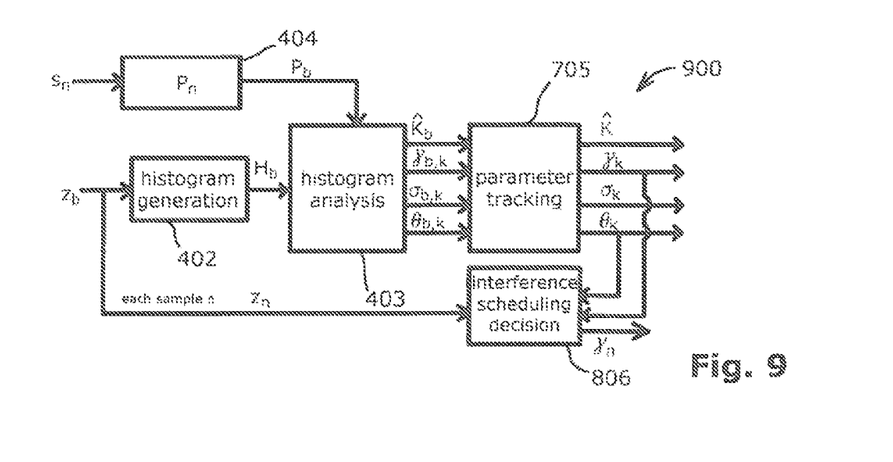
FIG. 9 is a block diagram illustrating an exemplary implementation of a device for estimating noise and interferer parameters using histogram analysis, parameter tracking and interference scheduling detection.

FIG. 9 illustrates a device for estimating noise and interferer parameters 900. The device 900 may be similar to devices 400, 700, and 800, and reference is made to the description above in order to avoid reiteration. As illustrated in FIG. 9, the interference scheduling detection samples $\gamma_n$ may be given by the long-term SINR estimates $\gamma_k$ of the detected interferer k as output by the parameter evaluation unit (parameter tracking) 705. It is also possible that the interference scheduling detection samples $\gamma_n$ may be given by the observation period-based (e.g., block-based) SINR estimates $\gamma_{b,k}$ of the estimator 403. In both cases, signal power samples $p_n$ may be input e.g. to the estimator 403 for computing SINR estimates $\gamma_{b,k}$ based on a ratio of a mean of square signal powers $|p_n|^2$ and the mean of noise and interference power $\mu_{b,k}$. The long-term SINR estimates $\gamma_k$ may be derived from the observation period-based SINR estimates $\gamma_{b,k}$ by, e.g., parameter tracking over an interferer-individual number of observation periods as described above.

The interference scheduling detection samples $\gamma_n$ may be indicative of an SINR at time index n. These SINR samples may then be delivered to any instance in the UE which may use such information, e.g., data detection, CE, CQI feedback generation, etc. In particular, the disclosure herein comprises channel estimation based on received pilot symbols and SINR samples $\gamma_n$ produced in accordance with the above description.

Figure 11:
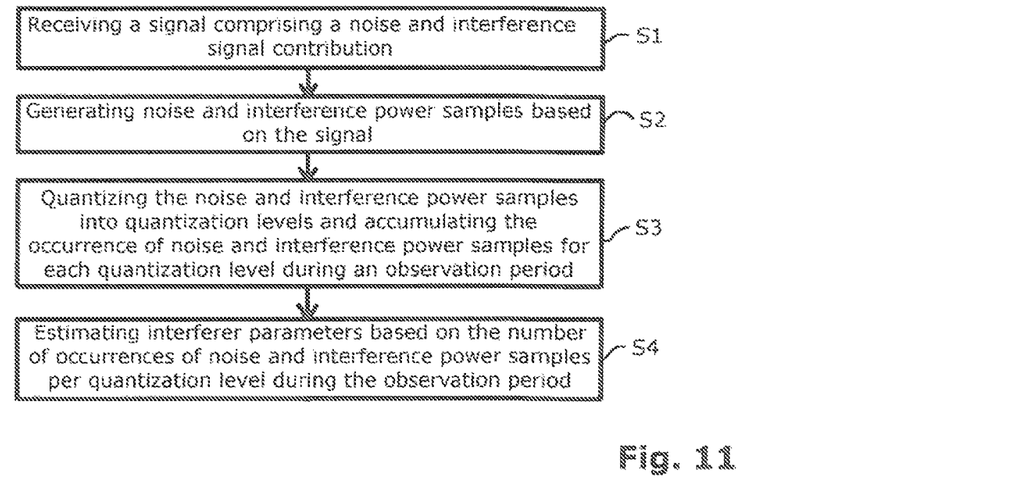
FIG. 11 is a flowchart illustrating an exemplary method of estimating noise and interferer parameters using histogram analysis.

Referring to FIG. 11, at S1, a method of estimating interferer parameters may comprise receiving a signal comprising a noise and interference signal contribution.

At S2, noise and interference power samples based on the signal may be generated. The generation of noise and interference power samples may be performed, e.g., by pre-CE noise power estimation or by any other known method.

At S3, the noise and interference power samples may be quantized into quantization levels and the occurrence of noise and interference power samples may be accumulated for each quantization level during an observation period. This process may also be referred to as histogram generation.

At S4, noise and interferer parameters may, e.g., be estimated based on the number of occurrences of noise and interference power samples per quantization level during the observation period. Parameter estimation may include histogram analysis (e.g. hard assignment analysis I as illustrated in FIG. 5 and soft-assignment analysis II as illustrated in FIG. 6) and, optionally, parameter averaging over interferer-specific averaging periods (i.e., parameter tracking) as, e.g., illustrated in FIGS. 7, 8 and 9.

At S4 it is, additionally or alternatively, possible to analyze the numbers of occurrence of noise and interference power samples per quantization level to obtain a function for assigning a specific noise and interference source to a noise and interference power sample.

Examples

The following examples pertain to further embodiments. Example 1 is a method method of estimating noise and interferer parameters, the method comprising receiving a signal comprising a noise and interference signal contribution; generating noise and interference power samples based on the signal; quantizing the noise and interference power samples into quantization levels and accumulating the occurrence of noise and interference power samples for each quantization level during an observation period; and estimating noise and interferer parameters based on the number of occurrences of noise and interference power samples per quantization level during the observation period.

In Example 2, the subject matter of Example 1 can optionally include wherein the noise and interferer parameters comprise the number of noise and interference sources.

In Example 3, the subject matter of Examples 1 or 2 can optionally include wherein the noise and interferer parameters comprise a mean power of the noise and interference power samples.

In Example 4, the subject matter of any one of Examples 1 to 3 can optionally include wherein the noise and interferer parameters comprise a power variance of the noise and interference power samples.

In Example 5, the subject matter of any one of Examples 1 to 4 can optionally include wherein the noise and interferer parameters comprise a weight factor of the noise and interference power samples.

In Example 6, the subject matter of any one of Examples 1 to 5 can optionally include wherein the noise and interferer parameters comprise noise and interference source separation thresholds.

In Example 7, the subject matter of any one of Examples 1 to 6 can optionally include estimating preliminary noise and interferer parameters based on the number of occurrences of noise and interference power samples per quantization level over the observation period, wherein to each noise and interference source a predetermined interval of quantization levels is assigned; estimating a soft assignment weighting function for each noise and interference source based on the preliminary noise and interferer parameters and a noise and interference source model probability distribution; and estimating the noise and interferer parameters based on the soft assignment weighting function and the number of occurrences of noise and interference power samples per quantization level over the observation period.

In Example 8, the subject matter of any one of Examples 1 to 7 can optionally include determining for each noise and interference source a number of observation periods over which the noise and interference source is present.

In Example 9, the subject matter of Example 8 can optionally include averaging the noise and interferer parameters over a number of observation periods depending on the determined number of observation periods of the respective noise and interference source.

In Example 10, the subject matter of Example 8 can optionally include wherein the presence of a noise and interference source is determined based on a local maximum search over the numbers of occurrences of noise and interference power samples per quantization level during each observation period.

In Example 11, the subject matter of any one of Examples 1 to 10 can optionally include wherein the noise and interferer parameters comprise noise and interference source separation thresholds, the subject matter further comprising: comparing a noise and interference power sample to the noise and interference source separation thresholds to obtain a comparison result indicative of a specific noise and interference source; and allocating the specific noise and interference source to the noise and interference power sample.

In Example 12, the subject matter of Example 7 can optionally include wherein the noise and interferer parameters comprise noise and interference source separation thresholds, and wherein each noise and interference source separation threshold is generated based on the soft assignment weighting functions for at least two noise and interference sources.

In Example 13, the subject matter of Example 12 can optionally include comparing the noise and interference power samples to the noise and interference source separation thresholds; and assigning to a noise and interference power sample a specific noise and interference source on the basis of the comparison result.

In Example 14, the subject matter of Example 13 can optionally include generating for each noise and interference power sample a signal-to-interference-plus-noise sample based on the specific noise and interference source.

In Example 15, the subject matter of Example 14 can optionally include wherein the signal-to-interference-plus-noise sample is a signal-to-interference-plus-noise ratio computed from the noise and interferer parameter of the specific noise and interference source assigned to the corresponding noise and interference power sample.

In Example 16, the subject matter of any one of Examples 1 to 15 can optionally include generating the noise and interference power samples based on a block cell-specific reference signals channel estimation function.

Example 17 is a device for estimating noise and interferer parameters comprising a power sample generation unit configured to generate noise and interference power samples of a received signal; an occurrence accumulation unit configured to quantize the noise and interference power samples into quantization levels and to accumulate the occurrence of noise and interference power samples for each quantization level during an observation period; and an estimator configured to estimate noise and interferer parameters based on the number of occurrences of noise and interference power samples per quantization level during the observation period.

In Example 18, the subject matter of Examples 17 can optionally include wherein the noise and interferer parameters comprise the number of noise and interference sources.

In Example 19, the subject matter of any one of Examples 17 to 18 can optionally include wherein the noise and interferer parameters comprise a mean power of the noise and interference power samples.

In Example 20, the subject matter of any one of Examples 17 to 19 can optionally include wherein the noise and interferer parameters comprise a power variance of the noise and interference power samples.

In Example 21, the subject matter of any one of Examples 17 to 20 can optionally include wherein the noise and interferer parameters comprise a weight factor of the noise and interference power samples.

In Example 22, the subject matter of any one of Examples 17 to 21 can optionally include wherein the noise and interferer parameters comprise interference source separation thresholds.

In Example 23, the subject matter of any one of Examples 17 to 22 can optionally include wherein the estimator comprises a first estimator unit configured to estimate preliminary noise and interferer parameters based on the number of occurrences of noise and interference power samples per quantization level over the observation period, wherein to each noise and interference source a predetermined interval of quantization levels is assigned.

In Example 24, the subject matter of any one of Examples 17 to 23 can optionally include wherein the estimator comprises a second estimator unit configured to estimate a soft assignment weighting function for each noise and interference source based on the preliminary noise and interferer parameters and a noise and interference source model probability distribution.

In Example 25, the subject matter of any one of Examples 17 to 24 can optionally include wherein the estimator further comprises a third estimator unit configured to estimate the noise and interferer parameters based on the soft assignment weighting function and the number of occurrences of noise and interference power samples per quantization level over the observation period.

In Example 26, the subject matter of any one of Examples 17 to 25 can optionally include an evaluation unit configured to determine for each noise and interference source a number of observation periods over which the noise and interference source is present and to average the noise and interferer parameters over a number of observation periods depending on the determined number of observation periods of the respective noise and interference source.

In Example 27, the subject matter of any one of Examples 17 to 26 can optionally include wherein the estimator is configured to determine the presence of a noise and interference source based on a local maximum search over the number of occurrences of noise and interference power samples per quantization level during each observation period.

In Example 28, the subject matter of any one of Examples 17 to 27 can optionally include an interference scheduling decision unit configured to compare a noise and interference power sample to a noise and interference source separation threshold to obtain a comparison result indicative of a specific noise and interference source for the noise and interference power sample.

In Example 29, the subject matter of any one of Examples 17 to 28 can optionally include wherein the interference scheduling decision unit is further configured to generate for each input power sample a signal-to-interference-plus-noise sample related to the specific noise and interference source.

In Example 30, the subject matter of any one of Examples 17 to 29 can optionally include an interference-plus-noise power sample generation unit configured to generate the noise and interference power samples based on a block cell-specific reference signals channel estimation function.

In Example 31 is a method of estimating noise and interferer parameters, the method comprising: generating noise and interference power samples based on an incoming signal; quantizing the noise and interference power samples into quantization levels and accumulating the occurrence of noise and interference power samples for each quantization level during an observation period; and analyzing the numbers of occurrence of noise and interference power samples per quantization level to obtain a function for assigning a specific noise and interference source to a noise and interference power sample.

In Example 32, the subject matter of Example 31 can optionally include wherein the function is configured to assign a specific noise and interference source to a noise and interference power sample if the noise and interference power sample falls between two noise and interference source separation thresholds associated with the specific noise and interference source.

In Example 33, the subject matter of Example 32 can optionally include wherein the two noise and interference source separation thresholds associated with the specific noise and interference source are derived based on weighting functions derived for the specific noise and interference source and for neighboring noise and interference sources.

In Example 34, the subject matter of Example 33 can optionally include wherein the two noise and interference source separation thresholds are based on the intersections of the weighting function derived for the specific noise and interference source with the weighting functions of two neighboring noise and interference sources.

In Example 35, the subject matter of any one of Examples 33 to 34 can optionally include wherein deriving the weighting function for a noise and interference source comprises: estimating a probability density of the number of occurrences of noise and interference power samples per quantization level for the noise and interference source based on a probability reference distribution; estimating an intensity of the noise and interference source; and computing the weighting function for the noise and interference source based on the estimated probability density for the noise and interference source and the intensity of the noise and interference source.

In Example 36, the subject matter of any one of Examples 317 to 35 can optionally include estimating a signal-to-interference-plus-noise ratio for a noise and interference source; and assigning the estimated signal-to-interference-plus-noise ratio to the specific noise and interference source on the basis of the function.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the invention may be implemented in discrete circuits, partially integrated circuits or fully integrated circuits or programming means.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

The invention claimed is:

1. A method of estimating noise and interferer parameters, the method comprising:
   receiving a signal comprising a noise and interference signal contribution;
   generating a plurality of noise and interference power samples based on the signal;
   quantizing the plurality of noise and interference power samples into quantization levels and accumulating occurrences of the plurality of noise and interference power samples for each quantization level during an observation period;
   estimating a plurality of preliminary noise and interferer parameters based on a number of occurrences of the plurality of noise and interference power samples per quantization level over the observation period, wherein to each noise and interference source a predetermined interval of quantization levels is assigned;
   estimating a soft assignment weighting function for each noise and interference source based on the plurality of preliminary noise and interferer parameters and a noise and interference source model probability distribution; and
   estimating a plurality of noise and interferer parameters based on the soft assignment weighting function and the number of occurrences of the plurality of noise and interference power samples per quantization level over the observation period.

2. The method of claim 1, wherein the plurality of noise and interferer parameters comprise a number of noise and interference sources.

3. The method of claim 1, wherein the plurality of noise and interferer parameters comprise one or more of a mean power of the plurality of noise and interference power samples, a power variance of the plurality of noise and interference power samples, a weight factor of the plurality of noise and interference power samples, and a plurality of noise and interference source separation thresholds.

4. The method of claim 1, further comprising:
   determining, for each noise and interference source, a number of observation periods over which the noise and interference source is present; and
   averaging the plurality of noise and interferer parameters over a number of observation periods depending on the determined number of observation periods of the respective noise and interference source.

5. The method of claim 4, wherein the presence of a noise and interference source is determined based on a local maximum search over the numbers of occurrences of the plurality of noise and interference power samples per quantization level during each observation period.

6. The method of claim 1, wherein the plurality of noise and interferer parameters comprise a plurality of noise and interference source separation thresholds, the method further comprising:
   comparing a noise and interference power sample to the plurality of noise and interference source separation thresholds to obtain a comparison result indicative of a specific noise and interference source; and
   allocating the specific noise and interference source to the noise and interference power sample.

7. The method of claim 1, wherein the plurality of noise and interferer parameters comprise a plurality of noise and interference source separation thresholds, and wherein each noise and interference source separation threshold is generated based on the soft assignment weighting functions for at least two of the plurality of noise and interference sources.

8. The method of claim 7, further comprising:
   comparing the plurality of noise and interference power samples to the plurality of noise and interference source separation thresholds;
   assigning to a noise and interference power sample a specific noise and interference source on the basis of the comparison result; and
   generating for each noise and interference power sample a signal-to-interference-plus-noise sample based on the specific noise and interference source.

9. The method of claim 8, wherein the signal-to-interference-plus-noise sample is a signal-to-interference-plus-noise ratio computed from the noise and interferer parameter of the specific noise and interference source assigned to the corresponding noise and interference power sample.

10. A device for estimating noise and interferer parameters, comprising:
    a power sample generator configured to generate a plurality of noise and interference power samples of a received signal;
    an occurrence accumulator configured to quantize the plurality of noise and interference power samples into quantization levels and to accumulate occurrences of the plurality of noise and interference power samples for each quantization level during an observation period; and
    an estimator configured to estimate a plurality of noise and interferer parameters based on the number of occurrences of the plurality of noise and interference power samples per quantization level during the observation period, wherein the estimator comprises:
    a first estimator configured to estimate a plurality of preliminary noise and interferer parameters based on the number of occurrences of the plurality of noise and interference power samples per quantization level over the observation period, wherein to each noise and interference source a predetermined interval of quantization levels is assigned, and
    a second estimator configured to estimate a soft assignment weighting function for each noise and interference source based on the plurality of preliminary noise and interferer parameters and a noise and interference source model probability distribution.

11. The device of claim 10, wherein the plurality of noise and interferer parameters comprise a number of noise and interference sources.

12. The device of claim 10, wherein the plurality of noise and interferer parameters comprise one or more of a mean power of the plurality of noise and interference power samples, a power variance of the plurality of noise and interference power samples, a weight factor of the plurality of noise and interference power samples, and a plurality of noise and interference source separation thresholds.

13. The device of claim 10, wherein the estimator further comprises:
a third estimator configured to estimate the plurality of noise and interferer parameters based on the soft assignment weighting function and the number of occurrences of the plurality of noise and interference power samples per quantization level over the observation period.

14. A device for estimating noise and interferer parameters, comprising:
a power sample generator configured to generate a plurality of noise and interference power samples of a received signal;
an occurrence accumulator configured to quantize the plurality of noise and interference power samples into quantization levels and to accumulate occurrences of the plurality of noise and interference power samples for each quantization level during an observation period;
an estimator configured to estimate a plurality of noise and interferer parameters based on the number of occurrences of the plurality of noise and interference power samples per quantization level during the observation period; and
an evaluator configured to determine, for each noise and interference source, a number of observation periods over which the noise and interference source is present and to average the plurality of noise and interferer parameters over a number of observation periods depending on the determined number of observation periods of the respective noise and interference source.

15. The device of claim 14, wherein the estimator is configured to determine the presence of a noise and interference source based on a local maximum search over the number of occurrences of the plurality of noise and interference power samples per quantization level during each observation period.

16. A device for estimating noise and interferer parameters, comprising:
a power sample generator configured to generate a plurality of noise and interference power samples of a received signal;
occurrence accumulator configured to quantize the plurality of noise and interference power samples into quantization levels and to accumulate occurrences of the plurality of noise and interference power samples for each quantization level during an observation period;
an estimator configured to estimate a plurality of noise and interferer parameters based on the number of occurrences of the plurality of noise and interference power samples per quantization level during the observation period; and
an interference scheduler configured to compare a noise and interference power sample to a noise and interference source separation threshold to obtain a comparison result indicative of a specific noise and interference source for the noise and interference power sample.

17. The device of claim 16, wherein the interference scheduler is further configured to generate for each input power sample a signal-to-interference-plus-noise sample related to the specific noise and interference source.

18. A method of estimating noise and interferer parameters, the method comprising:
generating a plurality of noise and interference power samples based on an incoming signal;
quantizing the plurality of noise and interference power samples into quantization levels and accumulating occurrences of the plurality of noise and interference power samples for each quantization level during an observation period; and
analyzing numbers of occurrences of the plurality of noise and interference power samples per quantization level to obtain a function, wherein the function is configured to assign a specific noise and interference source to a noise and interference power sample if the noise and interference power sample falls between a plurality of noise and interference source separation thresholds associated with the specific noise and interference source.

19. The method of claim 18, wherein the plurality of noise and interference source separation thresholds associated with the specific noise and interference source are derived based on weighting functions derived for the specific noise and interference source and for neighboring noise and interference sources.

20. The method of claim 19, wherein the plurality of noise and interference source separation thresholds are based on intersections of the weighting function derived for the specific noise and interference source with the weighting functions of two neighboring noise and interference sources.

21. The method of claim 19, wherein deriving the weighting function for a noise and interference source comprises:
estimating a probability density of the number of occurrences of the plurality of noise and interference power samples per quantization level for the noise and interference source based on a probability reference distribution;
estimating an intensity of the noise and interference source; and
computing the weighting function for the noise and interference source based on the estimated probability density for the noise and interference source and the intensity of the noise and interference source.

22. The method of claim 18, further comprising:
estimating a signal-to-interference-plus-noise ratio for the specific noise and interference source; and
assigning the estimated signal-to-interference-plus-noise ratio to the specific noise and interference source on the basis of the function.

\* \* \* \* \*